United States Patent

Henning, Jr. et al.

[11] 3,727,765
[45] Apr. 17, 1973

[54] SKIMMING DEVICE FOR USE ON A LIQUID SURFACE

[75] Inventors: John L. Henning, Jr.; Warren J. Robicheaux, both of Port Arthur, Tex.

[73] Assignee: Gulf Oil Corporation, Pittsburgh, Pa.

[22] Filed: Nov. 25, 1970

[21] Appl. No.: 92,639

[52] U.S. Cl. .................210/242, 137/386, 137/395, 210/DIG. 21
[51] Int. Cl. .............................................E02b 15/04
[58] Field of Search..................210/103, 104, 121, 210/125, 128, 292, 83, 105, 169, DIG. 21; 137/409, 430, 433, 386, 395

[56] References Cited

UNITED STATES PATENTS

| 2,661,094 | 12/1953 | Stewart | 210/242 |
|---|---|---|---|
| 3,303,932 | 2/1967 | Hirs et al. | 210/242 X |
| 3,512,640 | 5/1970 | Hellmann | 210/104 X |
| 1,107,391 | 8/1914 | Welch | 210/242 |
| 3,402,817 | 9/1968 | Dovel | 210/242 X |
| 1,263,810 | 4/1918 | Sauermann | 137/430 X |
| 1,764,825 | 6/1930 | Browne | 137/409 |
| 2,891,672 | 6/1959 | Veld et al. | 210/242 |
| 3,375,928 | 4/1968 | Chase | 210/83 |
| 3,534,859 | 10/1970 | Amero et al. | 210/DIG. 21 |

FOREIGN PATENTS OR APPLICATIONS

| 866,659 | 4/1961 | Great Britain | 210/242 |
|---|---|---|---|
| 804,368 | 11/1958 | Great Britain | 210/242 |

*Primary Examiner*—Samih N. Zaharna
*Assistant Examiner*—T. A. Granger
*Attorney*—Meyer Neishloss, Deane E. Keith and Paul L. Tillson

[57] ABSTRACT

A float-supported skimmer for removal of oil from the surface of a body of water. A float-supported skimmer trough is connected to a drain line through which skimmed oil is delivered to a sump and from the sump to a pump for discharging oil from the system. A valve in the discharge line from the pump controls the rate of discharge of oil from the system. An air bubbler line opens into the lower part of the skimmer trough and sends a signal responsive to the depth of oil in the skimmer trough to control the opening of the valve in the discharge line.

2 Claims, 4 Drawing Figures

INVENTORS.
JOHN L. HENNING, JR.
WARREN J. ROBICHEAUX

SKIMMING DEVICE FOR USE ON A LIQUID SURFACE

This invention relates to the removal of a low-density liquid immiscible with water from the surface of water and more particularly to apparatus for skimming a layer of such liquid from the water.

The removal of oil from the surface of water has become a more serious problem with the very large increased volume of oil transported by tankers. Among the methods of combating oil spills are spreading straw or other absorbent materials on the oil spill to soak up the oil, spreading sinking agents on the oil to increase its density to cause it to sink to the ocean floor, and to spread surface active agents on the oil to disperse the oil in the water. All of these methods have serious shortcomings. If straw or other absorbent materials are used, it is then necessary to collect the straw and later dispose of the contaminated straw. Both sinking agents and dispersants have in some instances caused more serious damage to marine life than the oil spilled. With all of these methods the oil spilled is lost.

Water used in processing at oil refineries frequently becomes contaminated with oil. To avoid discharging oil in water effluent from the refinery, much of the water used in refineries is delivered into settling ponds or tanks in which the oil rises to the surface of the water. Skimming apparatus is then used to remove the oil from the surface of the water, and oil-free water is discharged from a low level in the settling pond.

In the usual skimming apparatus a trough is supported at the water level by floats. The oil floating on the water flows over the edge of the trough into the trough and is pumped from the skimmer. If the pumping rate is too high, the level of water in the trough is lowered which causes the trough and floats to rise and thereby reduce the rate at which oil overflows into the trough. Continued pumping further lowers the liquid level in the trough until the skimmer becomes inoperative. If the pumping rate is lower than the rate at which oil flows into the trough, the trough is flooded and sinks to a lower level because of the increased weight of the liquid in the trough. The device can then become inoperative as a skimmer because excessive amounts of water flow into the trough.

This invention relates to skimming apparatus for removal of oil from the surface of settling ponds, or other bodies of water, in which a skimmer trough extends between and is supported by a pair of spaced floats. The skimmer trough is adjustable vertically on the floats to adjust the elevation of the upper edge of the trough relative to the floats and, thereby, the initial submergence of the overflow edge. A drain line from the lower end of the trough delivers liquid flowing into the trough to a sump from which the liquid is pumped from the system. A valve in the discharge line from the pump controls the rate of removal of liquid from the skimming apparatus. Control means operating in response to the level of liquid in the trough control the opening of the valve to control the rate of discharge of liquid from the skimming apparatus. The drain line is either flexible or provided with swivel joints to permit vertical movement of the floats in response to fluctuations in the liquid level of the settling pond.

Figure 1:
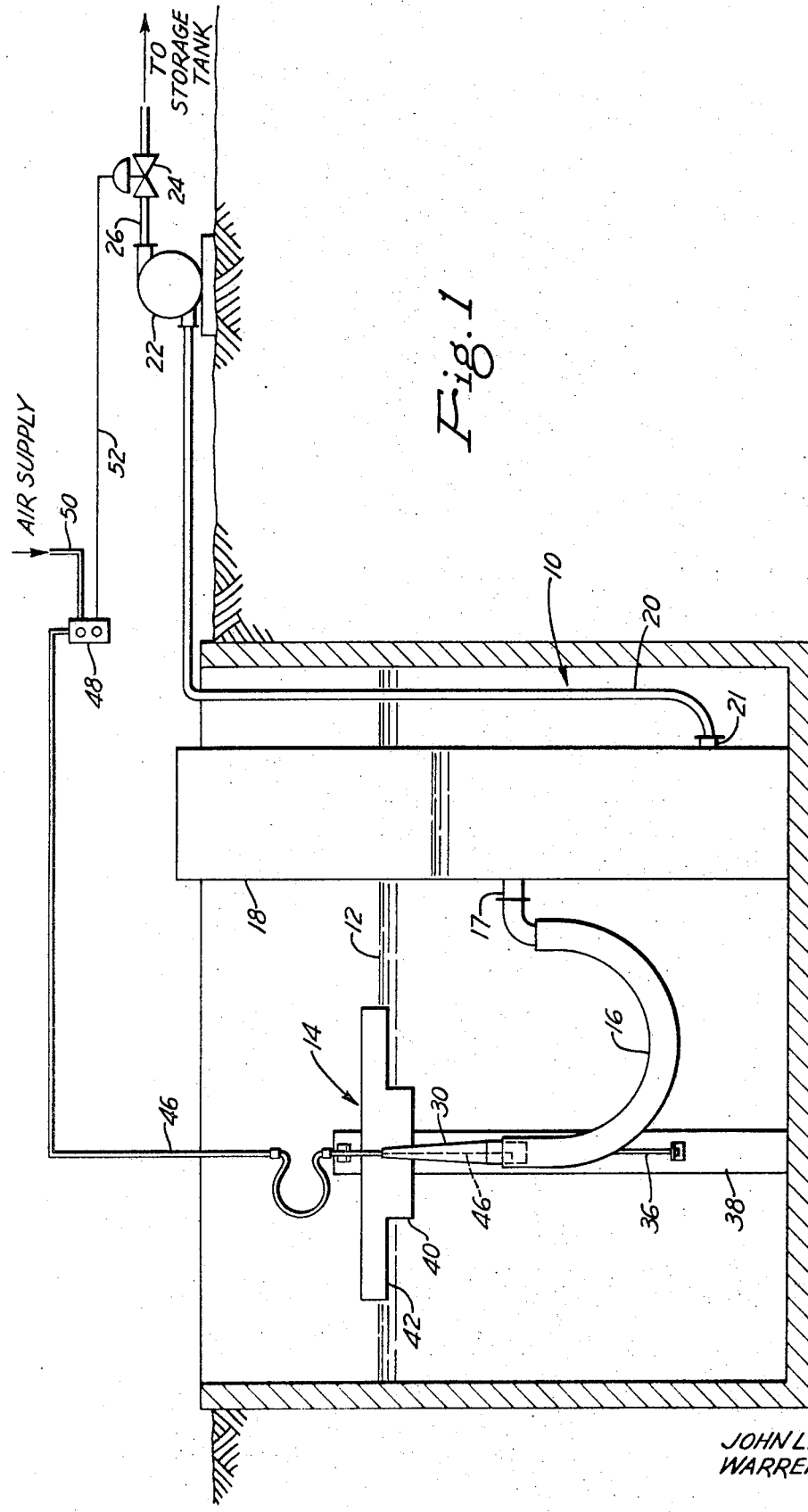
FIG. 1 is a diagrammatic view of the skimming apparatus of this invention floating in a settling pond.

Referring to FIG. 1 of the drawings, a settling pond, indicated generally by reference numeral 10, is shown with the surface of the liquid therein indicated by reference numeral 12. Floating on the liquid is a skimmer indicated generally by reference numeral 14 with a flexible drain line 16 extending from its lower end to the inlet 17 of a sump 18. A suction pipe 20 connects the outlet 21 of the sump 18 located below inlet 17 with a pump 22. A control valve 24 in the discharge line 26 from the pump controls the rate at which skimmed liquid is discharged from the system.

Figure 2:
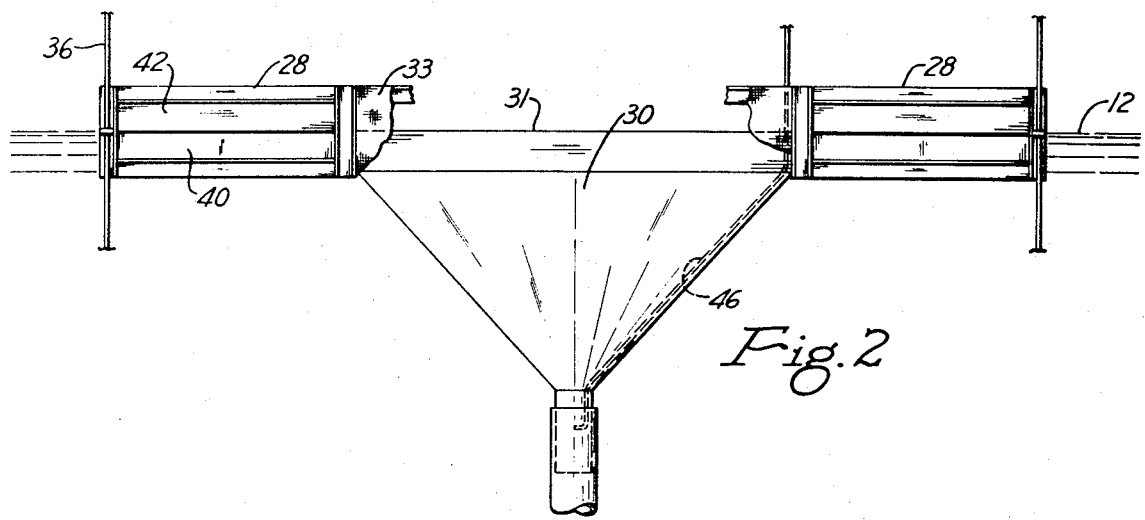
FIG. 2 is a front elevational view showing the floats and skimmer trough.
Figure 3:
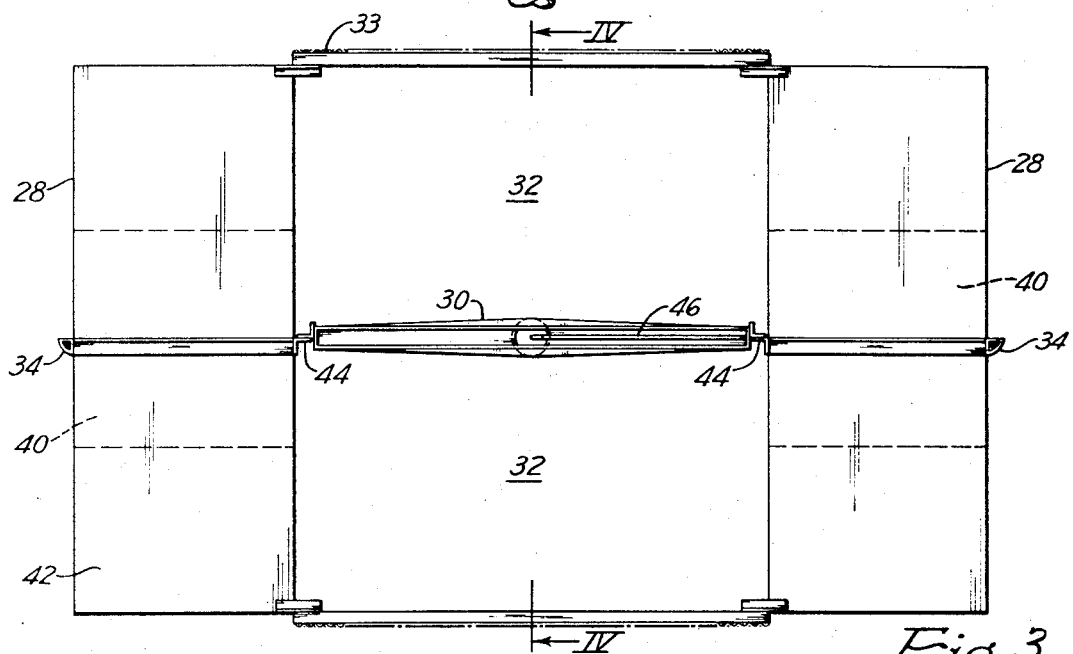
FIG. 3 is a plan view of the floats and skimmer trough used in the skimming apparatus of this invention.

Referring to FIG. 2, skimmer 14 consists of a pair of spaced parallel floats 28 between which a skimmer trough 30 is suspended with its upper overflow edge 31 just below the level 12 of the liquid in the settling pond. As is best shown in FIG. 3, the skimmer trough 30 is located at the midpoint of the floats 28 which are held apart by suitable framework to provide passages 32 through which liquid can flow to the skimmer trough. A screen 33 is mounted on framework between the floats 28 across the ends of passages 32 below and above the liquid level 12 to prevent movement of large solid and floating objects or debris to the skimmer trough. In the apparatus shown in the drawings, the skimmer is held at the desired location in the settling pond 10 by rings 34 which encircle guide rods 36 supported by posts 38 extending upwardly from the bottom of settling pond 10 or by other suitable means.

The floats 28 have a continuously submerged central buoyancy chamber 40 of sufficient volume for skimmer flotation from which thinner stabilizing chambers 42 extend. Buoyancy chamber 40 provides the primary buoyancy for the weight of the skimmer while stabilizing chambers 42 limit the submergence of the overflow edge of the skimmer thereby affording stability. Accurate initial adjustment of the level of the upper edge of the skimmer trough 30 is obtained by suspending the skimmer trough from angle irons 44 attached to the floats and provided with a plurality of bolt holes that permit the desired adjustment.

Figure 4:
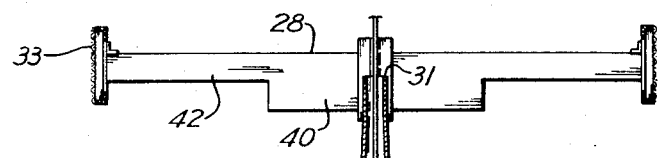
FIG. 4 is a vertical sectional view taken along section line IV—IV in FIG. 3.

As is best shown in FIGS. 1 and 4, an air bubbler line 46 extends downwardly into the skimmer trough 30 a distance adequate to locate its open lower end at a distance below the overflow edge 31 allowing a substantial range over which the liquid level in the trough can be controlled. In the embodiment illustrated in the drawings, the lower end of bubbler tube 46 is at the lower end of trough 30 but could be extended lower if necessary. Bubbler tube 46 is connected at its end remote from the trough 30 to a differential pressure cell 48 which in turn is connected to a suitable air supply line 50. A line 52 from the differential pressure cell 48 to control valve 24 is adapted to control the opening of that valve.

In the operation of the apparatus of this invention, the skimmer trough 30 is filled with liquid and the position at which the skimmer trough is supported by the floats is adjusted to locate overflow edge 31 at a desired maximum submergence below the level of the liquid level 12 and above the interface of oil and water in settling pond 10. Pump 22 is started to pump from the sump 18 liquid that flows through trough 30 and drain line 16 into sump 18. It is essential to this invention that the pump capacity when valve 24 is open exceeds the rate at which liquid will flow into the upper end of the skimmer trough at its initial submergence. Continued operation of the pump with valve 24 wide open will lower the level of liquid in sump 18 and in the skimmer trough 30. Lowering the level of liquid in skimmer trough 30 reduces the pressure in bubbler line 46 required to discharge air from the lower end of that line with the result that the signal from the differential pressure cell 48 delivered through line 52 to control valve 24 partially closes that valve and reduces the rate of discharge from the system. The reduced rate of flow of liquid will cause the liquid level in skimmer trough 30 to rise to an equilibrium position. Sump 18 provides gravity drainage from trough 30 through line 16, and flow through drain line 16 with its friction head loss aids the apparatus in reaching an equilibrium condition.

The trough structure with a narrow opening across its top, thin cross section and lateral taper toward the bottom contributes to the sensitivity and stability of the skimmer. The broad width at the top provides a long overflow edge of the trough, but the narrow opening limits the amount of liquid that can flow into the trough if the trough should for any reason be depressed excessively. The thin cross section and the taper toward the bottom reduce the amount of liquid in the trough; hence, a relatively small amount of liquid can cause a substantial change in the liquid level within the trough and thereby make the control means more sensitive while not greatly affecting the amount, and therefore the weight, of the liquid in the trough.

A further increase in the stability of the skimmer is provided by the float structure with a relatively narrow buoyancy chamber of substantial depth and an upper broad, shallow stabilizing chamber. If the thickness of the oil layer on the surface of the water should increase substantially, there would be a tendency for the float and consequently the trough to sink. The large horizontal cross-sectional area of the stabilizing floats will prevent a substantial change in the level of the overflow edge of the trough. If the thickness of the layer of oil on the water should decrease, there would be a tendency for the float structure to ride higher in the liquid. The relatively small horizontal cross section of the buoyancy chambers results in a small change in buoyancy with a decrease in the thickness of the oil layer.

The skimming apparatus of this invention has been shown with a flexible drain line extending from the lower end of the trough to the sump. Any structure that will allow free change in the vertical position of the skimming apparatus as a result of a change in liquid level can be used in place of the flexible drain line, and such structures are described as flexible in the claims. For example, rigid pipe with suitable swivel joints would be satisfactory.

The skimming apparatus of this invention permits continuous operation of the skimmer with a minimum of attention by the operator. Control of the rate of discharge of liquid from the skimmer in response to changes in level of liquid in the skimming trough stabilizes the position of the overflow edge of the skimming trough. Further stability and sensitivity are provided by the unique structure of the floats and trough.

We claim:

1. Apparatus for skimming oil from the surface of a body of water comprising a pair of spaced floats having a central buoyancy chamber of substantial depth and stabilizing chambers of less depth than the central buoyancy chamber extending laterally from the buoyancy chamber, a horizontal upwardly opening overflow trough extending between and supported by the floats, the opening in said overflow trough being narrow and of substantial length and at substantially the level of the bottom of the stabilizing chambers, said overflow trough tapering downward toward its lower end, a flexible drain line connected to the lower end of the overflow trough, a sump connected to the outlet end of the flexible drain line, a discharge line extending from the sump, a pump in the discharge line, the capacity of the pump exceeding the rate at which liquid flows into the trough whereby the liquid level in the trough is maintained below the opening, a control valve in the discharge line downstream of the pump, a bubbler line extending downwardly into the overflow trough and opening therein near the lower end of the trough, a gas supply source connected to the bubbler line, and means responsive to the pressure in the bubbler line for sending a signal to the valve to reduce the opening of the valve when the liquid level in the trough drops and increase the opening of the valve when the liquid level in the trough rises.

2. Apparatus for skimming a liquid immiscible with water and having a lower density than water from the surface of a body of water comprising a pair of spaced-apart floats; an overflow trough having a narrow elongated horizontal opening along its top supported by and between the floats with the opening slightly below the surface of the low-density liquid; said floats comprising a central buoyancy chamber of small horizontal cross-sectional area and substantial depth and stabilizing chambers of substantially larger horizontal cross-sectional area than the central buoyancy chambers extending laterally from the upper portion of the buoyancy chambers, the bottom of the stabilizing chambers being at substantially the level of the horizontal opening in the trough; a flexible drain line connected to the lower end of the trough; said trough having a narrow cross section and tapering from the ends of the opening downwardly to the flexible drain line whereby the volume of the trough is small relative to the volume of the floats and a small change in the volume of liquid in the trough causes a substantial change in the liquid level in the trough; a discharge line into which liquid from the drain line flows; valve means in the discharge line; and control means supported in the trough below the horizontal opening and responsive to the vertical distance from the horizontal opening in the trough to the liquid level in the trough to increase the opening in the valve means as the distance decreases and reduce the opening in the valve means as the distance increases.

* * * * *